Sept. 24, 1929.  L. HORNBOSTEL  1,729,443

LOCOMOTIVE DRIVING MECHANISM

Filed July 11, 1928

INVENTOR
Lloyd Hornbostel.
BY
ATTORNEY

Patented Sept. 24, 1929

1,729,443

UNITED STATES PATENT OFFICE

LLOYD HORNBOSTEL, OF BELOIT, WISCONSIN, ASSIGNOR TO WESTINGHOUSE ELECTRIC & MANUFACTURING COMPANY, A CORPORATION OF PENNSYLVANIA

LOCOMOTIVE DRIVING MECHANISM

Application filed July 11, 1928. Serial No. 291,810.

My invention relates in general, to locomotive-driving mechanisms and it has special relation to a driving mechanism for an electric locomotive, in which a plurality of electric motors are utilized for driving the wheel axels by means of side rods.

The object of my invention, generally stated, is to provide a compact and rugged driving mechanism for electric locomotives.

A further object of my invention is to provide a transmission mechanism wherein a plurality of electric motors are resiliently connected to a common jack-shaft.

The means by which these and other objects of the invention may be attained will be clearly understood upon studying the following specification in connection with the accompanying drawing, in which.

Figure 1:
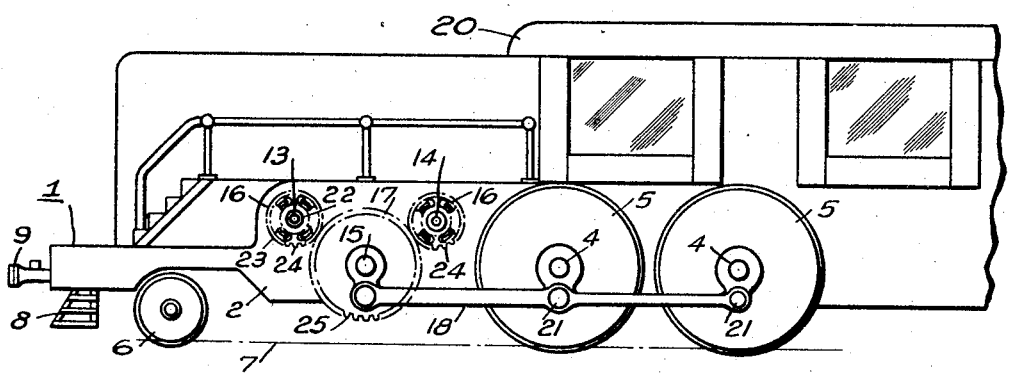
Figure 1 is a view, in side elevation of a portion of a locomotive having a drive mechanism embodying the invention.

Referring to Fig. 1 of the drawing, the locomotive shown comprises the usual frame 1 which is composed of a pair of longitudinally disposed side members 2 in which are journalled a plurality of driving axles 4 having drive wheels 5 which, together with a guiding truck 6, serve to support the locomotive on a track 7. The end of the frame 1 is provided with a pilot 8 and the usual coupling mechanism 9.

Figure 2:
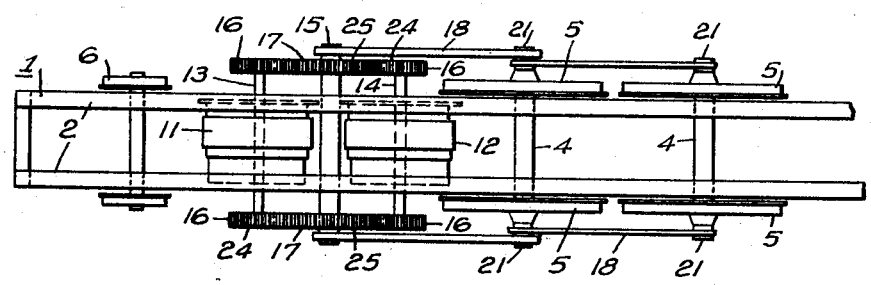
Fig. 2 is a plan view of the locomotive shown in Fig. 1, the cab portion being removed to more clearly show the driving mechanism.

For driving the locomotive, a pair of electric motors 11 and 12, having armature shafts 13 and 14, are disposed in side-by-side relation transversely of the frame 1 and on the respective sides of a transversely disposed jack-shaft 15 which is journalled in the side members 2. The armature shafts 13 and 14 are provided, at their ends, with pinions 16 which mesh with gear wheels 17 on the corresponding ends of the jack-shaft 15. As shown in Fig. 2, power which may be transmitted from the motors 11 and 12 to the jack-shaft 15 is transmitted to the driving wheels 5 by means of a pair of side-rod mechanisms 18 that operate in a well known manner.

The motors 11 and 12 and their electrical equipment are protected by means of a cab or body 20 which is mounted upon the frame 1 and which also serves as a control station for the locomotive operator.

In a locomotive utilizing side-rod drive mechanism, it is desirable that the side rods 18 be disposed to operate as closely as possible to the driving wheels 5, in order that crank arms 21 on the driving wheels may be made relatively short so that the bending moment acting upon them may be reduced to its lowest value.

As may be seen by referring to Figs. 1 and 2, the side rods 18 are disposed to operate very close to the gear wheels 17 and, consequently, pass close to the pinions 16 on the armature shaft 14, thereby greatly restricting the space available for these elements.

In order that the driving load may be equally distributed between the motors 11 and 12 and also between the four pinions 16 and the gear wheels 17 on the jack-shaft 15, it is desirable that flexible elements be introduced, preferably, in the connection between the armature shafts 13 and 14 and the pinions 16.

Heretofore, it was not thought feasible to embody flexible elements within the driving members, such as the pinions 16, inasmuch as the service to which they were subjected was too severe for any known design of flexible elements that could be utilized in the limited space available. Because of this limitation in the prior art, it was necessary to resort to the use of solid pinions in locomotive drive mechanisms, in which space was limited to such an extent that external flexible means could not be applied.

Figure 3:
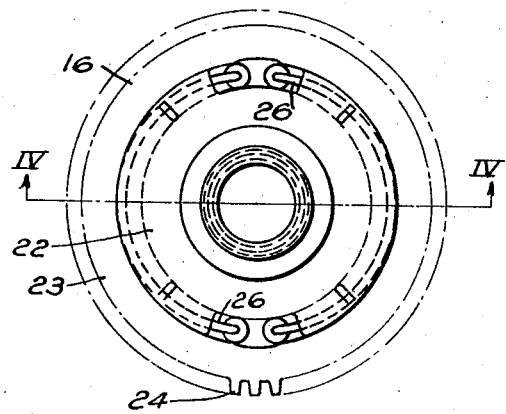
Fig. 3 is a view, in end elevation, of one of the flexible pinions utilized in my driving mechanism.
Figure 4:
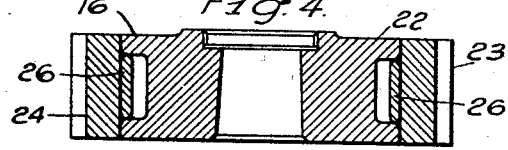
Fig. 4 is a view, in cross section, of the pinion, taken along the line IV—IV of Fig. 3.

However, by utilizing flexible pinions of the design shown in Figs. 3 and 4, it has been found to be practicable to introduce flexibility into a locomotive driving mechanism in an advantageous manner.

As shown, each of the pinions 16 comprises a center portion 22 upon which is carried a rim portion 23 having gear teeth 24 for meshing with complementary gear teeth 25 on the gear wheels 17. Torque is transmitted from the gear center 22 to the rim 23 by means of a pair of arc-shaped resilient members 26 that are disposed to be deflected when circumferential forces are applied at their ends, as more fully described in my copending application, Serial No. 191,317, filed May 14, 1927.

By reason of the utilization of the flexible pinions 16 on the armature shafts 13 and 14, the torque developed by the armatures 11 and 12 is evenly divided between the pinions 16 at the ends of the two armature shafts. Further, the armatures are relieved from excessive stresses which might result from shocks transmitted through the side-rod mechanism 18 for the reason that sudden dynamic forces are largely absorbed by the flexible elements 26 in the pinions 16.

From the foregoing description and explanation it may readily be seen that my invention has provided a locomotive driving mechanism that is simple and compact and that is capable of transmitting power from the motors to the driving wheels without subjecting the motors to excessive stresses or shocks.

Although I have described a specific embodiment of my invention, it will be clear to those skilled in the art that various modifications may be made in the arrangement of the details of the driving mechanism and all of its component parts without departing from the spirit and scope of the invention as defined in the appended claims.

I claim as my invention:

1. A locomative driving mechanism comprising a jack shaft, solid gear wheels mounted on the ends of the jack shaft, two armature shafts disposed in parallel relation to the jack shaft, and flexible pinions mounted on the ends of the armature shafts for engaging the gear wheels on the jack shaft.

2. In a locomotive driving mechanism, in combination, a pair of driving shafts, pinions mounted on the ends of the driving shafts, a jack shaft disposed parallel to the driving shafts, gear wheels on the ends of the jack shaft meshing with the pinions at corresponding ends of the driving shafts, and means disposed within the pinions for resiliently and independently connecting the pinions to the ends of the driving shafts.

3. A locomotive drive mechanism comprising two armature shafts, flexible pinions disposed on the ends of the armature shafts, a jack-shaft journalled parallel to the armature shafts, gear wheels on the ends of the jack-shaft for meshing with the flexible pinions on the armature shafts, and driving rods connected to the gear wheels, said driving rods being disposed to pass by the flexible pinions on the ends of one of the armature shafts.

4. In a locomotive, in combination, traction wheels for supporting the locomotive, a jack shaft extending transversely of the locomotive, gear wheels mounted on the jack shaft, side rods connecting the traction wheels to the gear wheels, a pair of motors disposed on opposite sides of the jack shaft, armature shafts within the motors, pinion centers mounted on the armature shafts, pinion rims carried by the pinion centers and disposed to mesh with the gear wheels on the jack shaft and flexible elements enclosed between the pinion rims and the pinion centers.

5. A locomotive drive mechanism comprising a plurality of driving-wheel axles, a jack shaft journalled in parallel relation to the wheel axles, solid gear-wheels mounted on the ends of the jack-shaft, driving rods for connecting the jack-shaft to the driving-wheel axles, two armature shafts disposed parallel to the jack shaft, pinions on the ends of the armature shafts for meshing with the gear-wheels on the jack shaft, and flexible means within the pinions for effecting resilient connection between the armature shafts and the jack-shaft.

6. A locomotive drive mechanism comprising a pair of driving-wheel axles, a locomotive frame carried by the driving-wheel axles, a jack shaft journalled transversely in the frame, gear wheels on the ends of the jack shaft, side rods for transmitting power from the gear wheels to the driving axles, driving motors disposed at the sides of the jack shaft, said motors having pinions meshing with the gear wheels on the jack shaft, some of said pinions being disposed between the locomotive frame and the side rods when the side rods are in one position, and flexible elements disposed within all of the pinions for resiliently connecting them to the motors.

In testimony whereof, I have hereunto subscribed my name this 5 day of July 1928.

LLOYD HORNBOSTEL.